Nov. 23, 1954 J. F. LARKIN 2,695,087
FRACTIONAL REVOLUTION CLUTCH
Filed April 11, 1952 5 Sheets-Sheet 1

INVENTOR
JAMES F. LARKIN,

ATTORNEY

Nov. 23, 1954  J. F. LARKIN  2,695,087
FRACTIONAL REVOLUTION CLUTCH
Filed April 11, 1952  5 Sheets-Sheet 5

INVENTOR
JAMES F. LARKIN,
BY Robert B. Larson
ATTORNEY

| United States Patent Office | 2,695,087
Patented Nov. 23, 1954 |

2,695,087

FRACTIONAL REVOLUTION CLUTCH

James F. Larkin, Chattanooga, Tenn.

Application April 11, 1952, Serial No. 281,821

17 Claims. (Cl. 192—33)

This invention relates to fractional revolution clutches, and more particularly to a clutch adapted to drive an element an exact fraction of a revolution at pre-selected intermittent intervals determined by supplementary control.

Clutches of this type have many uses in varying types of machinery and operations. They are, for instance, used with machinery in which there are continuously moving members and movement of certain other members is desired only at pre-determined intervals and in specified relationship with the motion of the continuously moving members. A machine of this type is to be described below.

Prior to my invention, the known fractional revolution clutches have not been completely satisfactory primarily because they could not be depended upon to drive an element the same exact fraction of a revolution at every operation. For example, there is the type of clutch utilizing a ratchet and pawl arrangement in which, at pre-selected intervals, a pawl rotating with a driving element is caused to engage the teeth of the driven ratchet for a fraction of a revolution. The fault with this type of clutch is that the pawl will engage the ratchet teeth at approximately the proper position, but may miss the exact position by one or two teeth. Assuming that the error is in the same direction with each operation, the movement of the driven element will progressively become farther and farther out of its normal relation to the movement of other parts of the machinery with which the clutch is used.

According to my invention, I provide a driving element having an abutting portion on its periphery and which, during normal operation, is continuously rotating and a driven element having, for example, four equally spaced abutments on its periphery and which rotates only at predetermined intervals. A ball is normally held out of the plane of rotation of said elements and thus out of engagement with said elements. Upon release by a supplementary control, the ball moves into the plane of rotation at a predetermined location to form a driving connection between abutting portions on said elements. After moving with the elements for a specified fraction of a revolution, the ball is forced out of engagement with the elements. The point at which the ball enters the plane of rotation and the point at which the ball is moved from the plane of rotation are stationary, so that, upon release of the ball by supplementary control into engagement with the elements, the movement of the driven element, with respect to the cooperating movement of other members of the machinery with which the clutch is used, will be identical with each operation.

It is, therefore, an object of my invention to provide a clutch embodying relatively rotatable driving and driven elements constructed and arranged so that an additional element effects a positive driving connection between the driving and driven elements and maintains that driving connection for a predetermined portion of a revolution of the driven element.

Another object of this invention is to provide a clutch of the type referred to and wherein the driving connection between the driving and driven elements becomes effective for initiating motion of the driven element at a predetermined position of the driving element.

My invention further has within its purview the provision of a clutch of the type described and wherein the periods of clutch operation during which the driven element is actuated by the driving element are subject to the control of an additional and separately actuated control element.

The clutch of this invention has for another of its purposes the provision of an intermediate driving mechanism affording an intermittent driving connection between two parts which each move cyclically, and which clutch serves to effect such cyclic movements in predetermined timed relationship to one another whenever the two parts are brought into simultaneous operation thereby.

Other objects and advantages of the invention will be apparent from the following description and the accompanying drawings in which similar characters of reference indicate similar parts throughout the several views.

Referring to the drawings.

The fractional revolution clutch herein disclosed is adapted for many uses and may be constructed to provide various fractional portions of a revolution of a driven member during a full revolution of a driving member. The form herein illustrated is adapted, as shown in Fig. 1, to control the timing and extent of movements of two parts of a mechanism.

As a practical example, I have shown in Figs. 1 through 6 how the clutch could be used in a newspaper counting and packaging machine. According to the present practice, the newspapers come rapidly off the printing presses and a large number of men are employed to count the newspapers and to tie them in appropriate bundles. These are the bundles which are distributed to the local paper boys.

Figure 1:
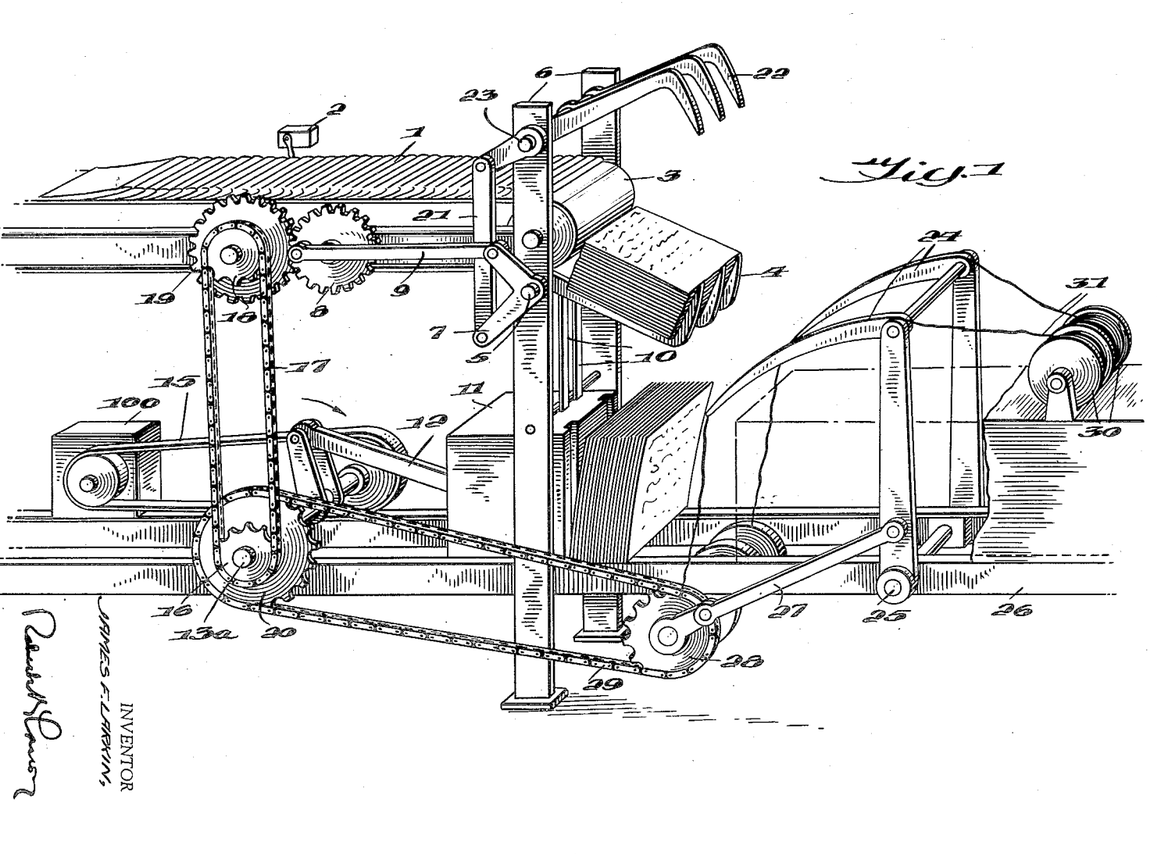
Fig. 1 is a perspective view illustrating an adaption of the fractional revolution clutch of this invention to a mechanism wherein it is adapted to the control and timing of the movements of one reciprocating member in respect to another.

Referring to Fig. 1, the newspapers as they come off the press are generally indicated by reference numeral 1. A counter 2 (whose operation is to be described later with reference to Fig. 2) counts the newspapers as they leave the press. As the newspapers come off a belt 3, they are caught by a supporting member 4. Supporting member 4 is pivotally mounted at 5 to posts 6. Belt crank lever 7, connected to gear 8 through linkage 9, is fixedly mounted to the supporting member 4. One revolution of gear wheel 8 will cause the supporting member 4, through the action of linkage 9 and the belt crank lever 7, to pivot in a clockwise direction through stripper bars 10, thus stripping the papers from supporting member 4 and causing them to drop into the packaging cavity below. Upon completion of the revolution of gear wheel 8, the supporting member 4 will have returned to the position shown in Fig. 1. The counter 2, as described below, determines when gear wheel 8 is to be actuated to drop the papers into the packaging cavity.

As the papers are dropped into position, ram 11 is constantly compressing the papers into a package. The ram is actuated through link 12 connected to crank shaft 13 which is driven by a motor 14 through a belt drive 15. During normal operation, the crank shaft 13 is constantly rotating in the direction of the arrow.

Fixedly mounted to crank shaft 13 is a sprocket 16 which through chain 17 drives sprocket 18, with a 1 to 1 ratio between sprockets 16 and 18. Periodically and under control of counter 2, sprocket 18 drives gear wheel 19 three quarters of a revolution through a fractional revolution clutch according to the invention. The ratio of the number of teeth on gear wheel 8 to the number of teeth on gear wheel 19 is 3 to 4, so that for every three quarters of a revolution of gear wheel 19, gear wheel 8 will rotate a full revolution.

During the revolution of gear wheel 8, when belt crank lever 7 causes support member 4 to rotate clockwise, belt crank lever 7 also actuates linkage 21 which, in turn, causes support member 22 to rotate in a clockwise direction about its axis 23 to hold the oncoming papers until support member 4 is returned to its normal position.

Needles 24, rotatably mounted at 25 to frame 26, are connected through linkage 27, sprocket 28, and chain 29 to sprocket 20. The ratio of the number of teeth in sprocket 28 to the number of teeth in sprocket 20 is three to four, so that, for every three fourths of a revolution of sprocket 20, sprocket 28 will rotate a complete revolution.

Sprocket 16 is connected to sprocket 20 through a fractional revolution clutch according to the present invention.

Spools 30 are mounted to frame 26 and carry twine or wire 31 for tying the bales of newspapers. The twine is fed through needles 24, the ends of which cooperate with a tying mechanism (which is not shown and which forms no part of the present invention) in the packaging cavity.

Figure 2:
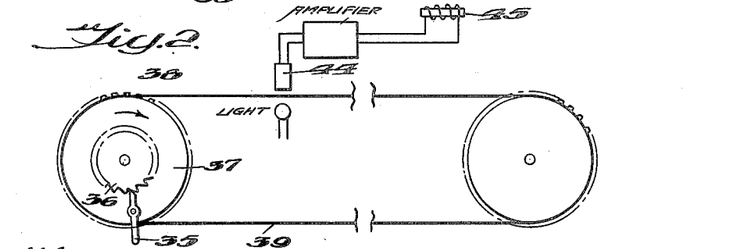
Fig. 2 is a diagrammatic elevational view of the control mechanism for the machine of Fig. 1.
Figure 3:
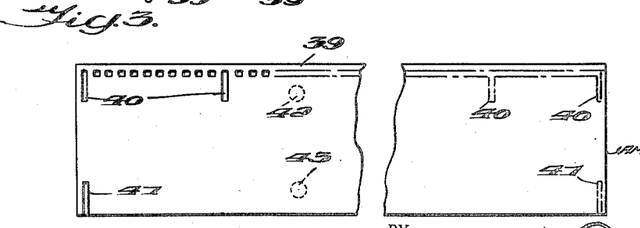
Fig. 3 is a diagrammatic plan view of the control mechanism of Fig. 2.

The fractional revolution clutches between members 18 and 19 and between members 16 and 20 are controlled by the supplementary control arrangement indicated generally at 2 in Fig. 1 and shown in detail in Figs. 2 and 3. Referring to Fig. 2, a pawl 35 engages a ratchet wheel 36 causing the ratchet wheel to move clockwise one tooth for each paper passing by pawl 35. Wheel 37 having teeth 38 rotates with ratchet wheel 36 causing tape 39 to move. Tape 39 is provided on one side with slots 40 and on the other side with slots 41. Beneath the tape are positioned two lamps 42 and 43. Immediately above the lamps and opposite the tape are two photo-electric cells 44, only one of which is shown in Fig. 2. The photo-electric cell is connected through an amplifier to a solenoid 45 which actuates control element 45a. The control element 45a is connected to each of the two fractional revolution clutches used with the machine.

As one of slots 40 or 41 passes between its respective light and photo-electric cell, the light is permitted to shine through the slot exciting its respective photo-electric cell which, in turn, causes its respective solenoid 45 to actuate a control element 45a in one of the fractional revolution clutches. With the type of machine described herein, there are more slots 40 than there are slots 41. In the present example, the ratio is 5 to 1. The slots 40 with their respective photo-electric cell and solenoid arrangement are associated with the fractional revolution clutch between members 18 and 19. Slots 41 with their respective photo-electric cell and solenoid arrangement are associated with the fractional revolution clutch between members 16 and 20. Thus, in the present example, for every ten papers counted, the clutch between members 18 and 19 will be caused to operate by control element 45a causing a group of ten papers to drop into the packaging receiving cavity. For every 50 papers counted and dropped into the cavity, the clutch between members 16 and 20 will be engaged causing needles 24 to move down to tie the package of 50 papers.

Figure 4:
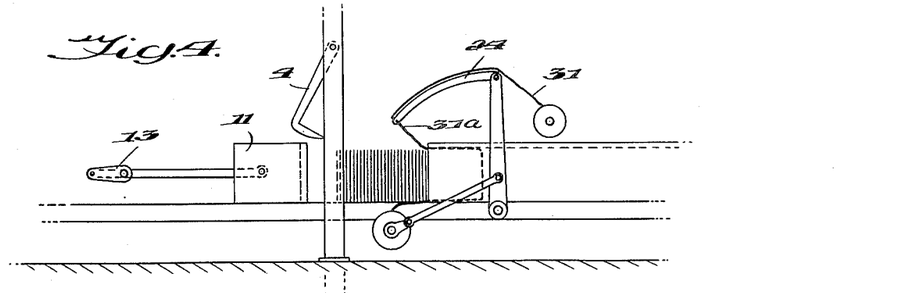
Figs. 4, 5, 6, and 7 are diagrammatic views of the machine of Fig. 1 showing the sequence of operation thereof.

Figs. 4 through 7 show generally the sequence of operation of the parts at the time of the tying operation. In Fig. 4, supporting member 4 has just dropped the last load of papers into the package receiving cavity. The clutch operating needles 24 has just been engaged and ram 11 is about to compress the papers into the final package.

Figure 5:
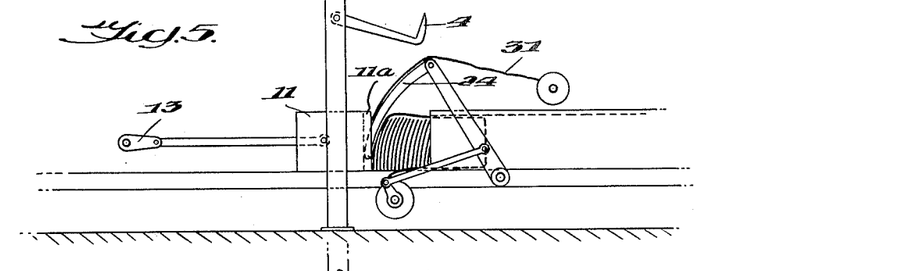

In Fig. 5, the ram has completed its compressing stroke and the needles 24 have carried the end 31a of the twine 31 counter-clockwise into slots 11a in the ram 11.

Figure 6:
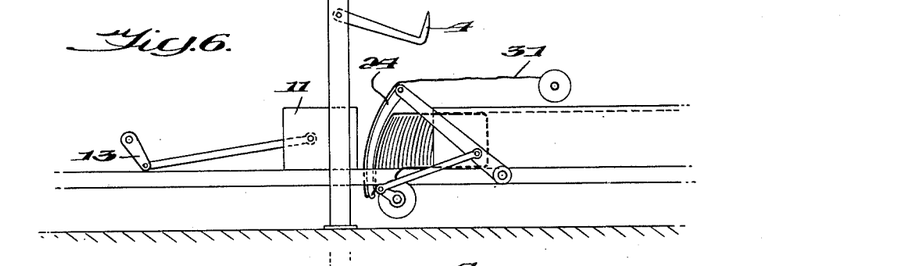

In Fig. 6, ram 11 has begun to move away from the packaging cavity while needles 24 have been moved to a position in which the tying operation is effected.

Figure 7:
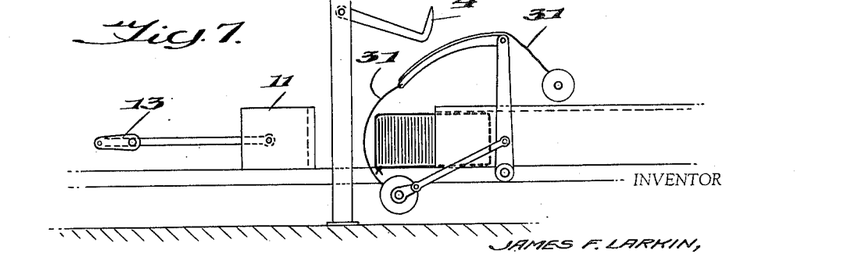

Fig. 7 shows the ram 11 at the extent of its return stroke, the package of newspapers has been tied, and a new length of string has been brought up from the tying operation to start a new package.

It is to be understood that the relationship between the various elements as set forth above is not exact but is given to show generally the cooperation between the parts during the packaging operation.

As indicated, a vital element in effecting the desired timing and synchronized operation of the moving part is the fractional revolution clutch which is described in Figs. 8 to 16.

In the clutch structure, as depicted in Figs. 8 to 16 inclusive of the drawings, the driving and driven members 46 and 46a connected, for example, to sprockets 16 and 20 respectively, are generally circular and are mounted in concentric relationship and for relative rotation by a sleeve bearing 47 secured to a hub 48 on the driving member 46 and journalled in a hub 49 on the driven member 46a. The driving member 46 is drivingly secured to the drive shaft 28 by a key 50. Fastening means such as a set screw 52 is threaded into the hub 48 of the driving member and abuts the key 50 to secure the driving member in a fixed position axially of the shaft 13a.

Figure 9:
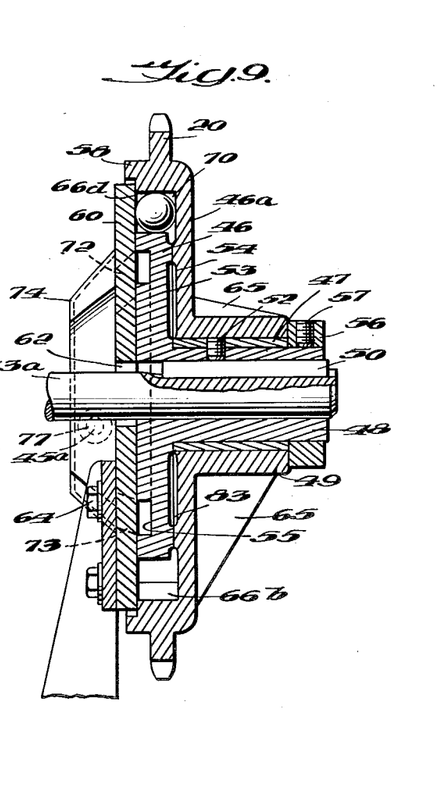
Fig. 9 is a side sectional view wherein the section is taken substantially on a line 9—9 of Fig. 7 and in the direction indicated by accompanying arrows.

As shown in Fig. 9, the driving member 46 has a relatively disk-like end portion 53 integrally adjoined to the hub 48. The driven member, on the other hand, has a cavity 54 therein at the end opposite the hub 49, which cavity is of a size and depth to receive the disk-like end portion 53 of the driving member. Circular bearing surfaces 55 on the disk-like end portion 53 of the driving member and within the cavity 54 in the driven member serve as end thrust bearings between those relatively movable parts of the clutch. At the end of the hub 48 of the driving member opposite the disk-like end portion 53 thereof, a collar 56 is secured thereto by fastening means such as a set screw 57, which collar abuts the end of the hub 49 of the driving member opposite the cavity 54 therein to hold the driving and driven members in their assembled relationship.

Radially, the driving and driven members are spaced from one another, and the driven member 46a has an axial flange 58 thereon which overlies the periphery of the driving member. Additionally, the flange 58 on the driven member has an internal peripheral recess 59 adjacent the cavity 54, which recess serves as a seat for a stationary end cover member 60. The cover member 60 has a central bore 62 therein through which the shaft 13a extends, and is supported adjacent the end surfaces of the driving and driven members 46 and 46a respectively by a stationary support 63 to which that stationary cover member is secured by fastening means, such as cap screws 64. On the outer surface of the driven member 46a, opposite the stationary cover member 60, a plurality of integral radial ribs 65 are provided to strengthen and rigidify that driven member.

Internally of the axial flange 58 on the driven member, a plurality of recesses 66a, 66b, 66c, and 66d open inwardly toward the cavity 54 and are spaced peripherally of the driven member from one another. The recesses 66a, 66b, 66c, and 66d are equally spaced angularly or peripherally of the driven member, since at each operation of the clutch, the driven member is to be moved through substantially the same fractional portion of a revolution. The pitch of the recesses is equal to the circumference through the recesses divided by the number of recesses. In the present instance, there are four recesses, because the driven member is to be moved through three-quarters of a revolution at each operation of the clutch. If the driven member was to be moved through two-thirds of a revolution at each operation of the clutch, the number of recesses would be three. It, thus, follows that the number of recesses for a particular clutch design is equal to the denominator of the fractional portion of a revolution through which the driven member is to be moved at one operation and during a complete revolution of the driven member. As will appear, the disclosed design is such that the minimum angle through which a driven member can be actuated at each operation is practically one-half of a revolution. Compensation for this limitation can be made, however, by selection of the gear ratio utilized between the driven member and the part which is actuated thereby.

Figure 8:
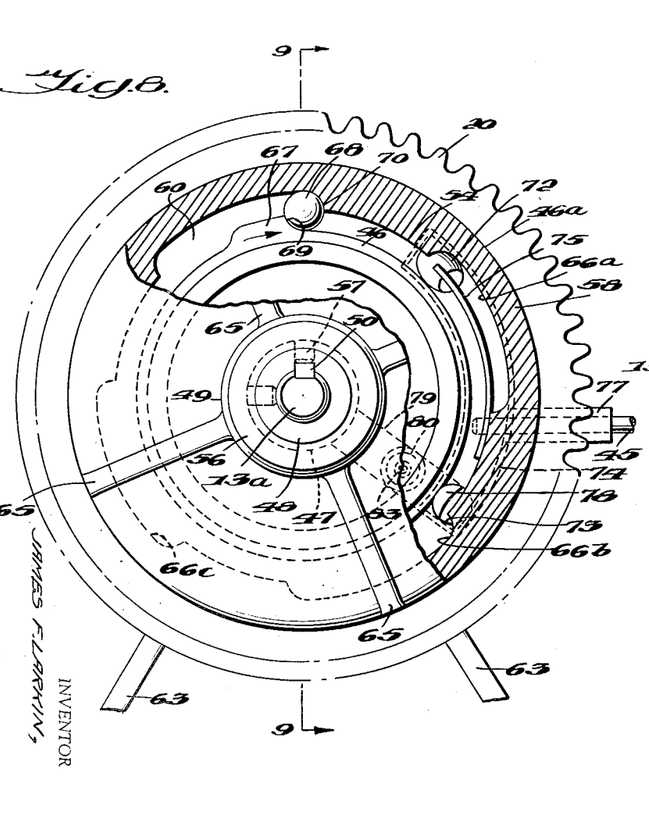
Fig. 8 is a front elevational view of a preferred embodiment of my fractional revolution clutch drawn to a relatively large scale and having a portion of the outer structure broken away to show details of the internal mechanism.

The driven member 46 of the disclosed clutch structure has on its periphery a lug or protuberance 67 which projects outwardly in a radial direction and which has a radius from the center of rotation less than the inner radius of the cavity 54 of the driven member. The radius of the rest of the disk-like end portion 53, other than the protuberance or lug 67, is substantially uniform and is such that an intermediate driving element 68, preferably in the form of a metal ball, will fit freely into one of the recesses 66a, 66b, 66c, or 66d so as to permit relatively free movement of the driving member 46 relative to the driven member 46a during a major portion of a revolution of the driving member. The intermediate driving element 68, however, is of a size such that it will be engaged between opposed gripping surfaces 69 and 70 at one end of one of the recesses and at one end of the lug or protuberance, as shown in Fig. 8, to transmit driving force circumferentially of the driving member and from the driving member to the driven member.

In the disclosed structure, the gripping surfaces 69 and 70 are opposed in angular relationship relative to diameters of the respective driving and driven members. When the intermediate driving element 68 is thus engaged between gripping surfaces at one end of one of the recesses in the driven member and one end of the lug or protuberance on the periphery of the driving member, the driven member is actuated by and with the driving member. During the driving of the driven member, the intermediate driving element 68 is retained axially of the clutch between the driven member 46a and the stationary member 60.

In order to provide for actuation of the driven member through only a predetermined fraction of a revolution during each operation of the clutch, I have provided means for diverting the intermediate driving element from its driving position between the driving and driven members for a pre-selected fractional portion of a revolution of the driving member. When the intermediate driving element is thus diverted, the driving member rotates freely relative to the driven member.

For effecting the aforementioned diversion of the intermediate driving element 68 from between the driving and driven members during a definite portion of a complete revolution, I have provided vertically spaced openings 72 and 73 in the stationary member 60, which openings are of a size to permit movement of the intermediate driving element therethrough and which openings are also disposed at a distance from the axis of rotation of the driving and driven members which effects their alignment with the path of travel of the intermediate driving element relative to the stationary member and the space between the surface of the driving member and the opposed surfaces of the recesses in the driven member. The circumferential spacing between the openings 72 and 73 is equal substantially to the portion of one revolution of the driving member during which the driven member is to remain stationary. On the outer surface of the stationary member 60, a channel type housing 74 is secured to the stationary member and provides a passage through which the intermediate driving element can move with relative freedom from the opening 72 to the opening 73. In the present instance, the housing 74 is arcuate in its longitudinal contour. By having the openings 72 and 73 spaced vertically from one another by less than 180° of the circumference of the stationary member and at appropriate positions, the intermediate driving element moves by gravitational force from the opening 72 to and through the opening 73.

The numerator of the fractional portion of a revolution through which the driven member rotates is determined by the distance between openings 72 and 73. Where this spacing is approximately equal to the pitch of the recesses, the numerator is $n-1$; and thus the fraction of a revolution is $$\frac{n-1}{n}$$

where $n$ is the number of recesses.

Figure 10:
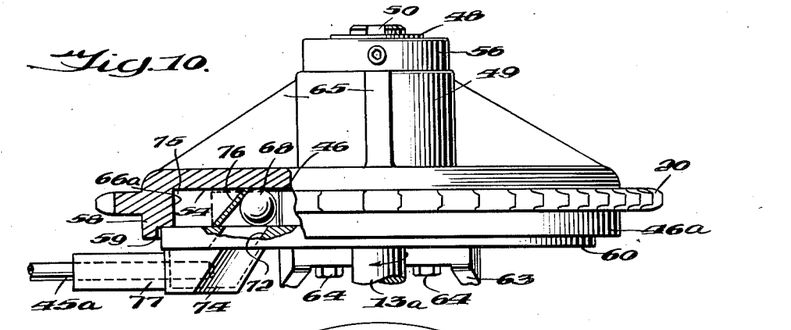
Fig. 10 is a top plan view of the clutch structure shown in Figs. 8 and 9 and has portions broken away to show details of the internal mechanism.

Diversion of the intermediate driving element 68 from between the gripping surfaces of the driving and driven members and through the opening 72 is insured by the use of a stationary deflecting element 75 which, in the disclosed structure, comprises an arcuately curved and relatively thin blade secured to the stationary member 60 so as to project between the driving and driven members on the side of the opening 72 remote from the one on which the intermediate driving element approaches the opening while driving the driven element. As depicted in Fig. 10, the deflecting element 75 has an angularly disposed end surface 76 which projects angularly over the entrance end of the opening 72 to engage the intermediate driving element at the entrance to the opening 72, thereby to deflect it forcibly from between the gripping surfaces and into the opening 72.

Figure 11:
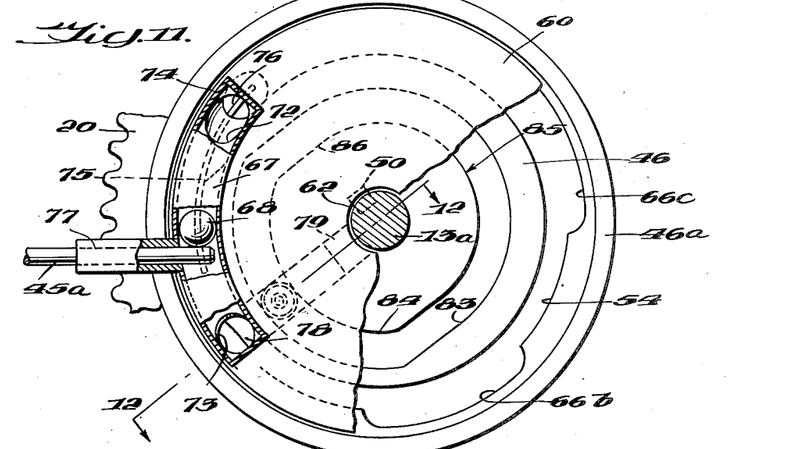
Fig. 11 is a rear elevational view with parts broken away to show details of the structure.

Between the openings 72 and 73, the control element 45a operated by the solenoid in Fig. 2, extends into the housing 74 to provide a movable obstruction for controlling the passage of the intermediate driving element through the housing 74 and from the upper to the lower opening. As shown in Fig. 11, the control element 45a is mounted for linear sliding movement in a bearing 77 which is secured to the side position of the housing 74.

When the control element 45a is retracted, the intermediate driving element passes downwardly through the housing 74 to the opening 73. However, when the end portion of the control element extends into the housing 74, as shown in Fig. 11, the intermediate driving element is retained in its diverted position and away from the driving and driven members, so that actuation of the driven member is prevented, and the driving member is free to rotate relative to the driven member. From the foregoing description, it may be readily understood that the control element 45a provides a means by which the operation of the disclosed clutch is initiated or prevented. Referring again to the disclosed exemplary adaptation of my invention which is depicted in Figs. 1–3, the retraction of the control element 45a is effected for a limited period by the number of papers counted by control 2.

Figures 13, 14:
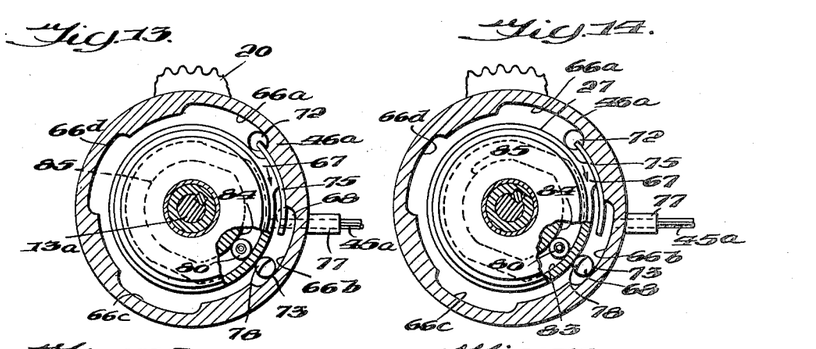
Figs. 13, 14, 15, and 16 are front sectional views of the disclosed clutch which illustrate different positions of the operating parts and depict phases of the operation of the clutch mechanism.
Figure 15:
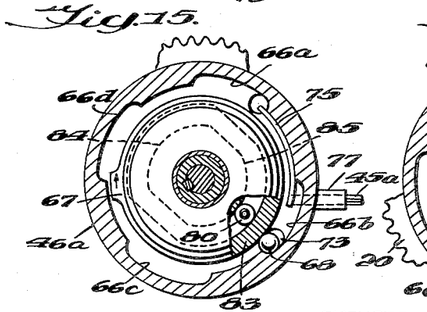

It can be seen that, if the driving element 68 is released by operation of control element 45a, just as the lug 67 is in the position shown in Fig. 14, lug 67 might engage driving element 68 just as it is part way out of opening 73. Since the opening 73 in member 60 is stationary, something undesirable is bound to happen such as shearing the driving element 68, or the key in shaft 13a, or the like. Therefore, it is desirable to time the release of the driving element 68 at a point when lug 67 has passed opening 73.

Figure 12:
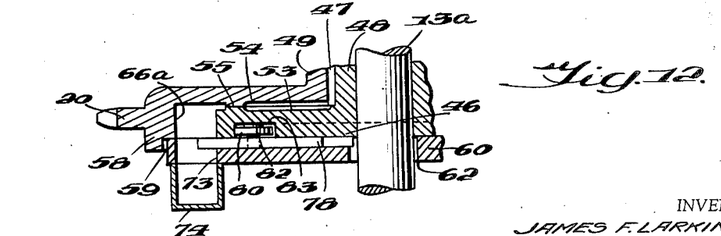
Fig. 12 is a fragmentary side sectional view taken substantially on line 12—12 of Fig. 11 and in the direction indicated by arrows.

In the structure herein disclosed, the accomplishment of the desired timing is effected by the use of a gate for determining the timing of the passage of the intermediate driving element 68 through the lower opening 73 for engagement between the driving and driven members; the gate being moved in timed relationship to the movements of the driving member. As shown in Figs. 8, 11, and 12, a slide block 78 serves as a gate and is linearly movable in a channel 79 to and from positions in which it obstructs and thereby controls the passage of the intermediate driving element 68 through the opening 73 to a position in one of the recesses of the driven member. A cam following roller 80 is secured to the slide block 78 and mounted for rotation relative thereto by a pin 82. This cam follower 80 moves in, and is guided by a cam channel 83 in the face of the driving member. The cam channel 83 has arcuate portions 84 and 85 of different radii and intermediate connecting portions 86 and 87. The shapes and radii of the cam portions are selected so that the gate formed by the slide blocks 78 only clears the opening 73 for the passage of the intermediate driving element during a portion of the revolution of the driving member and when the cam follower is in the portion 85 of the cam channel.

The portion 85 of the cam channel which opens the gate for passage of the intermediate driving element through the opening 73 is so disposed with respect to the single lug or protuberance 67 on the surface of the driving element that it is possible for the intermediate driving element to get into a driving position between the driving and driven members only when the driving member has passed opening 73, thus preventing jamming between the driving and stationary members referred to above.

Figure 16:
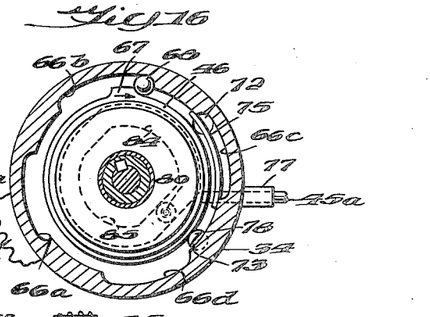

A sequence of the operations of the parts of the disclosed fractional revolution clutch mechanism may be observed by reference to Figs. 13, 14, 15 and 16. In Fig. 13, the intermediate driving element is in a diverted position out of its driving relationship between the driving and driven members, and is retained in that position by the control element 33. With this relationship, the driving member is free to rotate relative to the driven member, and the driven member remains stationary. As shown in Fig. 14, the control element 33 has been retracted, and the intermediate driving element 68 has fallen to a position in the opening 73, where it is prevented from entering the recess 66b in the driven member by the slide block 78. However, when the lug or protuberance 67 on the driving member has passed beyond the opening 73 from the position shown in Fig. 14 to the position shown in Fig. 15, the slide block 78 has been retracted, so that the intermediate driving element has moved through the opening 73 into the recess 66b of the driven member. In the latter position of the intermediate driving element, it is engaged by the lug or protuberance 67 during its succeeding movement with the driving member. With engagement between the driving and driven members, as shown in Fig. 16, the driven member moves with the driving member through the predetermined fractional revolution and until the intermediate driving element 68 reaches the opening 72 into which it is deflected by the stationary deflecting element 75. After being deflected into its diverted position, the cycle of operation of the parts of the clutch may be repeated.

The paper packaging machine and the fractional revolution clutch having been described, the operation of the machine with the two clutches will be briefly described.

The counter at (Fig. 1) counts papers 1 as they are moved toward supporting arms 14 by belt 3. Each paper causes pawl 35 (Fig. 2) to move ratchet wheel a small fraction of a turn, thus moving the perforated tape 39. When, for example, 10 papers are counted, opening 40 appears between the light 42 and photoelectric cell 44. Cell 44, through an amplifier energizes solenoid 45.

At this moment, the driving member 67 in the clutch between sprocket 18 and gear 19 might be in any position, for example, that shown in Fig. 13. The energization of solenoid 45 causes the withdrawal of control element 45a, releasing the ball 68 to the position shown in Fig. 14 where it is held in housing 74 by slide block 78. After driving member 67 has passed opening 73, the ball is released and subsequently engaged between driving member 67 and the surface 66b on driven member 46a. Driven member 46a and gear wheel 19 are then turned three fourths of a revolution until the ball 68 is forced out of engagement by deflecting element 75.

During the three quarter revolution, gear 8 is turned a full revolution causing the papers on supporting member 14 to be deposited in the packaging cavity, while the oncoming papers are retained by member 22.

The operation referred to above occurs a predetermined number of times, for example, five times. Every fifth time an opening 40 moves between light 42 and photo-electric cell 44, a corresponding opening 41 moves between its light 43 and a corresponding photo-electric cell (similar to cell 44). Thus, the clutch between members 18 and 19 and the clutch between members 16 and 20 are simultaneously set in operation by the release of the respective intermediate driving balls 68. The operation shown generally in Figs. 4 to 7 occurs as explained above.

It is to be understood that the relative movements of the various members of the paper packaging machinery need not be exactly as shown and described here. For example, the release of the balls 68 in the respective clutches need not be simultaneous but can easily be varied by a minor adjustment in the control box 2. However, once the optimum adjustment is made, it is of greatest importance that each operation be almost exactly the same as each previous operation and that no progressive errors occur to throw the machinery further and further out of adjustment.

My clutch is designed especially for obtaining the desired similarity of operation. Referring to Figs. 1 and 13 to 16, it can be seen that the driving elements 67 on the two clutches will always have the same relative position because of the 1 to 1 driving ratio through chain 17. (It is to be recalled that sprockets 16 and 18 each have a driving member 46 fixedly mounted for rotation therewith.) Assuming that the balls 68 are released simultaneously, driven members 46a will be engaged at substantially the same time with each revolution. Even if it happened that, after the last operation, the recesses at 66 in the respective clutches were a few degrees out of phase with each other, no difficulty would be encountered. The driven member in one of the clutches would be engaged first, but immediately thereafter the driven member of the second clutch would be engaged, and the relative positions of the two driven members for the rest of the three quarter revolution would be exactly as desired.

The use of a fractional revolution clutch has many advantages with machinery such as the newspaper packing equipment described herein. One of the advantages can be observed by referring to Figs. 4 to 7. Ram 11 makes a complete stroke and return for every revolution of the crank shaft 13. The complete operation of needles 24 takes only three fourths of a revolution. Therefore, if the operation needles 24 is timed to begin when ram 11 is at approximately top dead center, the needles will move down and up again one fourth of a revolution before ram 11 has returned to top dead center. In this way, the possibility that the needles 24 would be damaged by ram 11 is eliminated.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim as new and desire to secure by Letters Patent of the United States is:

1. A fractional revolution clutch comprising, in combination, a stationary back plate having a plane inner surface and a circular periphery, a driven member of generally circular shape mounted for rotation relative to the back plate and having a cavity therein facing toward the plane inner surface of the back plate, a driving member mounted for rotation in said cavity between the driven member and back plate and having drive means secured thereto, said driving member having a radially projecting driving lug on the periphery thereof, said driven member having a plurality of spaced segmental recesses therein opening into said cavity, an intermediate driving element of a size to fit into and project radially from one of said recesses between the driven member and the periphery of the driving member so as to be engaged by said lug on the driving member for transmitting driving force from the driving member to the driven member, and means forming vertically displaced upper and lower openings in said plane inner surface of the back plate and a passageway connecting said openings, said openings being aligned with the path of travel of said intermediate driving element when it is engaged between the driving and driven members, and means for diverting the intermediate driving element from between said driving and driven members for a predetermined portion of a revolution of the driving member.

2. A fractional revolution clutch as defined in claim 1, and a movable trap element for retaining the intermediate driving element in the passageway diverted from between the driving and driven members.

3. A fractional revolution clutch as defined in claim 1, and wherein said means for diverting the intermediate driving element from between the driving and driven members includes a cam operated gate for opening and closing the lower one of said vertically displaced openings to the movement of the intermediate driving element therethrough in timed relationship to the movements of the driving element, thereby to effect a timed relationship between the movements of the driving and driven members.

4. A fractional revolution clutch as defined in claim 1, and wherein the spacing of said recesses is equal and the number of said segmental recesses in the driven member determines to the fractional portion of a revolution through which the driven member is turned during one revolution of the driving member and while the intermediate driving element is engaged between the driving and driven members, which fractional portion is $$\frac{n-1}{n}$$

where $n$ is the number of recesses.

5. A fractional revolution clutch as defined in claim 1, and wherein the spacing between said vertically displaced openings in the back plate is nearly equal to the pitch between two adjacent segmental recesses in the driven member.

6. A fractional revolution clutch as defined in claim 1, and wherein said means for diverting the intermediate driving element from between the driving and driven members includes a fixed guide strip secured to the back plate between the driving and driven members and between said vertically spaced openings adjacent the upper one of the openings for deflecting the intermediate driving element from between the driving and driven members and into said upper one of the openings.

7. A fractional revolution clutch comprising, in combination, generally circular driving and driven members mounted in adjacent and concentric relationship for rotation relative to one another, said driving and driven members having peripheral portions in spaced and opposed relationship, the peripheral portion of one of said members having a lug thereon projecting radially toward the peripheral portion of the other member, the peripheral portion of said other member having a plurality of spaced circumferential recesses therein opening toward said one of the members, an intermediate driving element of a size to fit into and project radially from any one of said recesses to an extent for engagement between one end of the recess and said lug to establish a driving connection for the transmission of driving force from the driving to the driven member, and means for effecting removal of the intermediate driving element from between the driving and driven members for a predetermined portion of a revolution of the driving member, said last-named means including a stationary plate adjacent the path of said lug, means forming circumferentially spaced holes in said plate and a passageway connecting said holes, and a separate stationary element disposed for engagement with the intermediate driving element at a pre-selected position of the driving member to force said driving element out of its driving connection and into one of said holes.

8. A fractional revolution clutch as defined in claim 7, and wherein said means for effecting removal of the intermediate driving element from between the driving and driven members for a predetermined portion of a revolution of the driving member includes a cam operated part for closing and opening the other of said holes and moved in timed relationship to the driving member for determining the time of entrance of the driving element between the driving and driven member to the starting of motion of the driven member at a pre-selected position of the driving member.

9. A fractional revolution clutch as defined in claim 7, and wherein the spacing of said recesses is approximately equal and the number of said circumferential recesses in the driven member determines the fractional portion of a revolution through which the driven member is turned during one revolution of the driving member when the intermediate driving element is engaged between the driving and driven members, which fractional portion is $$\frac{n-1}{n}$$

where $n$ is the number of recesses.

10. A fractional revolution clutch adapted during normal operation to limit the rotation of a driven member to a predetermined fractional portion of a revolution of a driving member and comprising, in combination, driving and driven members mounted in adjacent and concentric relationship for rotation relative to one another, one of said members having a protuberance thereon facing toward a portion of the other member, said other member having a series of circumferentially spaced recesses therein at positions aligned with said protuberance during relative rotation of the members, an intermediate driving element of a size to fit into and project from one of said recesses to an extent for engagement between one end of the recess and said protuberance to establish a driving connection for the transmission of driving force from the driving to the driven member, said intermediate driving element describing a path when in driving position, and means, including a stationary member at all times fixed in said path of said intermediate driving element, for forcibly effecting diversion of the intermediate driving element from between the driving and driven members for a predetermined portion of a revolution of the driving member.

11. A fractional revolution clutch as defined in claim 10, and wherein said means for effecting diversion of intermediate driving element from between the driving members also includes a cam operated gate moved in timed relationship to the driving member for determining the time of entrance of the driving element between the driving and driven members so as to effect the starting of motion of the driven member at a pre-selected position of the driving member.

12. A fractional revolution clutch as defined in claim 1, and wherein the spacing between said openings is less than the pitch between adjacent recesses and said recesses are equally spaced circumferentially, and the number of said recesses being equal to the denominator of the fraction defining the portion of a revolution through which the driven member is turned by a full revolution of the driving member.

13. In a fractional revolution clutch, the combination comprising driving and driven members mounted in adjacent and concentric relationship for rotation relative to one another, said members having spaced and opposed surface portions thereon, an intermediate driving element normally free of both members and of a size to be gripped between said opposed surface portions to transmit driving force from the driving member to the driven member, said intermediate driving element describing a path when said intermediate driving element is in driving position, and means including a stationary member at all times fixed in said path of said intermediate driving element for diverting the intermediate element from between the driving and driven members for a predetermined fraction of a revolution.

14. In a fractional revolution clutch, the combination comprising driving and driven members mounted in adjacent and concentric relationship for rotation relative to one another, said members having portions in spaced relationship and at least one of said members being provided with opposed gripping surfaces angularly disposed around a circumference of said member, an intermediate driving element of a size to fit between and be gripped by the gripping surfaces for transmitting driving force from the driving to the driven member, a stationary member adjacent the space between said portions of the driving and driven members and having an opening therein at a position aligned with the path of movement of the intermediate driving element when gripped between said surfaces of the members, and a stationary deflecting element secured to said stationary member adjacent said opening, and at all times fixed in the path of said intermediate driving element for forcing the intermediate driving element from between the driving and driven members and into said opening.

15. In a fractional revolution clutch, the combination comprising driving and driven members mounted in adjacent and concentric relationship for rotation relative to one another, said members having portions in spaced relationship and at least one of said members being provided with opposed gripping surfaces angularly disposed around a circumference of said member, an intermediate driving element of a size to fit between and be gripped by the gripping surfaces for transmitting driving force from the driving to the driven member, a stationary member adjacent the space between said portions of the driving and driven members and having an opening therein at a position aligned with the path of movement of the intermediate driving element when gripped between said surfaces of the members, a finger fixed to said stationary member and at all times fixed in the path of said driving element for forcing the intermediate driving element from between the driving and driven members and into said opening, a gate mounted for sliding movement relative to said stationary member to and from positions covering said opening, and cam means for moving the gate in timed relationship to the rotation of one of said members.

16. A fractional revolution clutch adapted during normal operation to limit the rotation of a driven member to a predetermined fractional portion of a revolution of a driving member and comprising, in combination, driving and driven members mounted in adjacent and concentric relationship for rotation relative to one another, one of said members having a circular guide surface thereon which is concentric to the axis of rotation thereof and faces the other member and a protuberance thereon projecting outwardly from the guide surface and facing toward a portion of the other member, said other member having a series of circumferentially spaced recesses therein in opposed relation to the guide surface and at positions aligned with said protuberance during relative rotation of the members, an intermediate driving element of a size to fit into and project from one of said recesses to an extent for engagement with the guide surface and between one end of the recess and said protuberance to establish a driving connection for the transmission of driving force from the driving to the driven member, and means including a stationary member adjacent the driving and driven members for effecting diversion of the intermediate driving element from between the driving and driven members for a predetermined portion of a revolution of the driving member.

17. In a fractional revolution clutch, the combination comprising driving and driven members mounted in adjacent and concentric relationship for rotation relative to one another, said members having spaced and opposed surface portions thereon, an intermediate driving element normally free of both members and of a size to be gripped between said opposed surface portions to transmit driving force from the driving member to the driven member, and means including a stationary member at a preselected position relative to the driving and driven members for removing the intermediate element from its driving position between the driving and driven members for a predetermined portion of a complete circle of revolution of the members.

References Cited in the file of this patent

UNITED STATES PATENTS

| Number | Name | Date |
|---|---|---|
| 1,586,544 | White | June 1, 1926 |
| 1,612,623 | Evans | Dec. 28, 1926 |
| 1,655,804 | Zuckerman | Jan. 10, 1928 |
| 1,980,757 | Janda | Nov. 13, 1934 |
| 2,181,088 | Horton et al. | Nov. 21, 1939 |
| 2,224,770 | Mills | Dec. 10, 1940 |
| 2,442,574 | Storck | June 1, 1948 |
| 2,488,820 | Laube | Nov. 22, 1949 |
| 2,556,010 | Swanson | June 5, 1951 |

FOREIGN PATENTS

| Number | Country | Date |
|---|---|---|
| 87,642 | Germany | July 22, 1896 |
| 95,776 | Sweden | May 23, 1939 |
| 699,893 | France | Nov. 21, 1929 |